United States Patent
Long et al.

(10) Patent No.: US 12,212,393 B2
(45) Date of Patent: Jan. 28, 2025

(54) CQI SATURATION MITIGATION IN DOWNLINK MASSIVE MU-MIMO SYSTEMS

(71) Applicant: Telefonaktiebolaget LM Ericsson (publ), Stockholm (SE)

(72) Inventors: Jianguo Long, Kanata (CA); Shaohua Li, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 423 days.

(21) Appl. No.: 17/624,394

(22) PCT Filed: Jul. 18, 2019

(86) PCT No.: PCT/IB2019/056178
§ 371 (c)(1),
(2) Date: Jan. 3, 2022

(87) PCT Pub. No.: WO2021/009552
PCT Pub. Date: Jan. 21, 2021

(65) Prior Publication Data
US 2022/0360309 A1    Nov. 10, 2022

(51) Int. Cl.
*H04B 7/06* (2006.01)
*H04B 17/336* (2015.01)

(52) U.S. Cl.
CPC ......... *H04B 7/0632* (2013.01); *H04B 7/0617* (2013.01); *H04B 7/0626* (2013.01); *H04B 17/336* (2015.01)

(58) Field of Classification Search
CPC .. H04B 7/0632; H04B 17/336; H04B 7/0617; H04B 7/0626
(Continued)

(56) References Cited

U.S. PATENT DOCUMENTS 8,903,327 B2 * 12/2014 Garavaglia ........... H04W 24/10
                                                    455/67.11
9,107,087 B2 *  8/2015 Li .................... H04L 25/0224
(Continued)

FOREIGN PATENT DOCUMENTS

CN        103297176 A      9/2013
CN        103493392 A      1/2014
(Continued)

OTHER PUBLICATIONS

International Search Report and Written Opinion dated Apr. 14, 2020 issued in PCT Application PCT/IB2019/056178, consisting of 12 pages.
(Continued)

*Primary Examiner* — Melvin H Pollack
(74) *Attorney, Agent, or Firm* — Weisberg I.P. Law, P.A.

(57) ABSTRACT

Methods and systems for mitigating channel quality indication (CQI) saturation in a channel state information (CSI) report received from a wireless device (WD) are disclosed. In one or more embodiments, a WD is provided. The WD includes processing circuitry configured to mitigate channel quality indication (CQI) saturation in a CSI report to a network node by at least in part receiving configuration information comprising any one or more of: a power offset value, a number of channel state information reference signal, CSI-RS, ports, and a rank restriction. The WD then generates the CSI report such that the CSI report comprises a CQI value based at least in part on the received configuration information and optionally causes transmission of the CSI report.

36 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 9,178,583 | B2* | 11/2015 | Nam | H04L 5/0023 |
| 9,590,749 | B2* | 3/2017 | Chen | H04B 7/063 |
| 10,374,839 | B2* | 8/2019 | Park | H04L 1/00 |
| 10,484,102 | B2* | 11/2019 | Chakraborty | H04B 15/00 |
| 10,516,459 | B2* | 12/2019 | Park | H04B 7/0626 |
| 10,560,168 | B2* | 2/2020 | Park | H04B 7/066 |
| 10,651,901 | B2* | 5/2020 | Park | H04B 7/0626 |
| 10,651,909 | B2* | 5/2020 | Seo | H04L 5/0053 |
| 10,667,287 | B2* | 5/2020 | Takeda | H04J 11/00 |
| 10,707,907 | B2* | 7/2020 | Sagi | H04B 1/109 |
| 10,886,979 | B2* | 1/2021 | Forenza | H04B 7/0452 |
| 10,911,996 | B2* | 2/2021 | Yiu | H04W 36/06 |
| 10,925,116 | B2* | 2/2021 | Zhang | H04L 25/0226 |
| 10,944,183 | B2* | 3/2021 | Park | H01Q 21/061 |
| 10,985,811 | B2* | 4/2021 | Forenza | H04B 7/10 |
| 11,115,098 | B2* | 9/2021 | Islam | H04L 1/0003 |
| 11,159,222 | B2* | 10/2021 | Yang | H04B 7/0652 |
| 11,202,264 | B2* | 12/2021 | Ciccarelli | H04B 1/40 |
| 11,211,977 | B2* | 12/2021 | Park | H04L 5/0023 |
| 11,218,207 | B2* | 1/2022 | Cha | H04L 5/005 |
| 11,271,625 | B2* | 3/2022 | Park | H04L 5/0051 |
| 11,336,354 | B2* | 5/2022 | Park | H04B 7/0626 |
| 11,870,717 | B2* | 1/2024 | Park | H04L 5/0094 |
| 11,889,413 | B2* | 1/2024 | Rangan | H04B 7/0686 |
| 2013/0072123 | A1 | 3/2013 | Garavaglia | |
| 2017/0111098 | A1* | 4/2017 | Kim | H04B 7/0632 |
| 2022/0417778 | A1* | 12/2022 | Rahman | H04L 5/0057 |

FOREIGN PATENT DOCUMENTS

| | | | | |
|---|---|---|---|---|
| CN | 108370266 A | | 8/2018 | |
| CN | 115053561 A | * | 9/2022 | ............. H04B 7/024 |
| CN | 110892649 B | * | 9/2023 | ........... H04B 7/0623 |
| EP | 3 522 390 A1 | | 8/2019 | |
| JP | 2013176039 A | * | 9/2013 | |
| JP | 2016105625 A | * | 6/2016 | ............. H04B 7/024 |
| WO | 2017/0266863 A1 | | 2/2017 | |
| WO | WO-2017146765 A1 | * | 8/2017 | ........... H04B 7/0626 |
| WO | 2018/145259 A1 | | 8/2018 | |
| WO | 2019/109625 A1 | | 6/2019 | |
| WO | WO-2023091816 A1 | * | 5/2023 | ........... H04B 7/0626 |

OTHER PUBLICATIONS

3GPP TS 36.213 V15.4.0 (Dec. 2018); 3rd Generation Partnership Project; Technical Specification Group Radio Access Network; Evolved Universal Terrestrial Radio Access (E-UTRA); Physical Layer Procedures (Release 15), consisting of 550 pages.

3GPP TS 38.214 V15.4.0 (Dec. 2018); 3rd Generation Partnership Project; Technical Specification Group Radio Access Network; NR; Physical Layer Procedures for Data (Release 15), consisting of 102 pages.

3GPP TS 38.331 V15.4.0 (Dec. 2018); rd Generation Partnership Project; Technical Specification Group Radio Access Network; NR; Radio Resource Control (RRC) Protocol Specification (Release 15), consisting of 474 pages.

Chinese Office Action dated Dec. 12, 2023 and English language summary translation of the Chinese Office Action issued in corresponding Chinese Patent Application No. 201980098540.9, consisting of 11 pages.

* cited by examiner

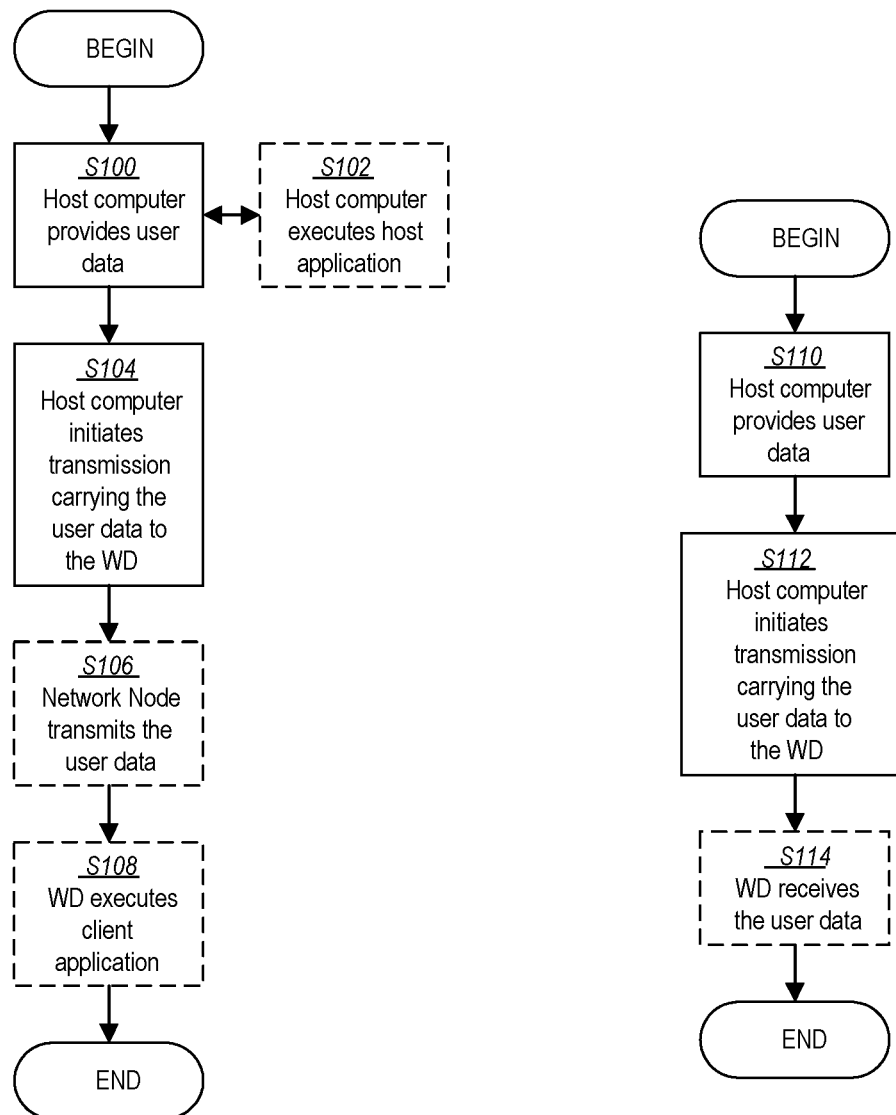

CQI SATURATION MITIGATION IN DOWNLINK MASSIVE MU-MIMO SYSTEMS

CROSS-REFERENCE TO RELATED APPLICATION

This application is a Submission Under 35 U.S.C. § 371 for U.S. National Stage Patent Application of International Application Number: PCT/IB2019/056178, filed Jul. 18, 2019 entitled "CQI SATURATION MITIGATION IN DOWNLINK MASSIVE MU-MIMO SYSTEMS," the entirety of which is incorporated herein by reference.

TECHNICAL FIELD

Wireless communications and in particular, mitigating channel quality indication (CQI) saturation.

BACKGROUND

In wireless communications, multiple-input and multiple-output (MIMO) technology is becoming more and more popular and has been incorporated into wireless broadband standards like the Third Generation Partnership Project (3GPP) 4$^{th}$ Generation (4G) Long Term Evolution (LTE) and 5$^{th}$ Generation (5G) New Radio (NR). Downlink (DL) multi-user (MU) MIMO, or simply DL MU-MIMO, allows one base station, e.g., an eNB or gNB, to communicate with multiple wireless devices (WD) simultaneously using the same time frequency resource. DL MU-MIMO is usually a close-loop MIMO system, i.e., the DL channel state information (CSI) perceived on the WD is feedbacked to the base station and used by base station to determine the downlink transmission format, i.e., transmission block size (TBS), rank and modulation and coding rate scheme (MCS).

The CSI reporting, as specified in one or more wireless communication standards such as 3rd Generation Partnership Project (3GPP), 4G LTE and 5G NR, assumes single user (SU) MIMO transmission as a WD may not be aware, when the WD sends CSI report, how many, and which if any, WDs may be paired in future transmissions. This SU CSI report may not be accurate if it is directly used to determine the MU MIMO transmission format when multiple WDs are paired together for downlink transmission. The reason for the inaccuracy in the SU CSI report is that, first, the downlink transmit power may be shared by all users; and second, multiple WDs paired together to use the same time/frequency resource for transmission may introduce additional inter-stream interference. Both power sharing and inter-stream interference from other paired WDs may contribute to the decrease of the signal interference noise ratio (SINR) for each paired WD and create a gap between actual MU-MIMO CSI and WD reported CSI. To accurately determine the DL transmission format and achieve optimal throughput and block error rate, additional downlink CSI estimation may need to be done on the base station for MU MIMO transmission. This additional downlink CSI estimation on the base station uses WD reported CSI as an input to set an absolute reference for DL signal power as well as noise and interference power, based on what is perceived, i.e., measured or received, by the WD. Note that a channel quality indication (CQI) can be considered as quantized DL post equalization SINR.

One issue with WD CSI reports is CQI saturation. In a case where actual DL post equalization SINR is higher than the SINR corresponding to highest possible CQI, i.e., 15, the reported CQI SINR may be capped or saturated, thereby creating a "capped SINR" scenario where the highest SINR that may be reported is lower than the actual DL post equalization SINR. This may happen in massive MIMO systems with large number of antennas which provide very high beamforming gain. FIG. 1 illustrates a two-dimensional antenna element array 2. A typical massive MIMO system consists of a two-dimensional antenna elements array with M rows, N columns and K polarizations (K=2 in case of cross-polarization).

Using capped SINR for the MU-MIMO CSI estimation may result in an over conservative SINR estimation for the MU-MIMO transmission. In some wireless communication systems, this kind of CSI estimation error may be compensated for by an outer-loop link adaptation which is driven by downlink acknowledgement (ACK) and non-acknowledgement (NACK), feedbacked by the WD after transport block detection. When the CSI estimation error is big, outer-loop link adaptation may need a long time to converge and result in degraded performance.

A CSI report includes a CQI, preceding matrix indication (PMI), rank indication (RI) and CSI-RS resource indication (CRI). CQI can be considered a quantized SINR to achieve as closely as possible the desired coding rate indicated by CQI index for reported PMI and RI, as described, for example, in one or more wireless communication standards such as 3GPP TS 36.213 for LTE and 3GPP Technical Specification (TS) 38.214 for NR. The highest CQI index 15 represents SINR needed to achieve the highest coding rate supported by the wireless communication standard for a given PMI and RI, which is, for example, roughly 20 dB for LTE and NR.

Referring now to FIG. 2, CQI is shown on the vertical axis 4 and SINR is shown on the horizontal axis 6. Let γ_CQI15 be the SINR corresponding to CQI 15. If the actual downlink post equalization SINR is higher than $\gamma_{CQI15}$, CQI 15 will be reported. Hence, the base station has no knowledge what the actual downlink SINR is as the base station maps CQI15 to $\gamma_{CQI15}$. Further, when multiple WDs are paired together for MU transmission, the WD reported CQI may be reduced due to the power being split between WDs and due to extra inter-stream interference between paired WDs. In a case where the actual DL SINR is much higher than $\gamma_{CQI15}$, the estimated MU-MIMO SINR on base station may be very conservative and result in poor system performance. FIG. 3 is an illustration of the conservative SINR estimation caused by CQI saturation in a MU MIMO system discussed with respect to FIG. 2.

SUMMARY

Some embodiments advantageously provide methods and systems for mitigating the discussed CQI saturation issue for DL massive MIMO systems. Accordingly, CQI saturation may be mitigated by configuring multiple Channel State Information Reference Signal (CSI-RS) resources for each WD to extend the CQI linear range at the low end and high end of the SINR. Embodiments further include associating each CSI report with certain CSI-RS resources, configuring a different number of CSI-RS antenna ports to the above-mentioned CSI-RS resources and/or performing different beamforming for the above-mentioned CSI-RS resources to mitigate CQI saturation. In other embodiments, a different power control offset value is configured for the above-mentioned CSI-RS resources that indicate a CQI adjustment that is used to mitigate CQI saturation. In yet other embodiments, a different rank restriction is configured for different CSI reports that indicates a CQI adjustment that may be used to mitigate CQI saturation. For example, the WD reported rank can be restricted to its lowest rank at a low SINR and its highest rank at high SINR to maximize the CQI linear range. The network node may then process the received CQI value based on the transmitted configuration information to derive the SINR.

According to one aspect of the disclosure, a wireless device, WD, is provided. The wireless device includes processing circuitry configured to mitigate channel quality indication, CQI, saturation in a channel state information, CSI, report to a network node by at least in part: receiving configuration information comprising any one or more of: a power offset value, a number of channel state information reference signal, CSI-RS, ports, and a rank restriction; generating the CSI report, the CSI report comprising a CQI value based at least in part on the received configuration information; and optionally causing transmission of the CSI report.

According to one or more embodiments of this aspect, the number of CSI-RS ports is less than a first threshold. According to one or more embodiments of this aspect, the first threshold is selected such that the CQI value is not in a saturated region. According to one or more embodiments of this aspect, the processing circuitry is further configured to determine the CQI value based at least in part on the received power offset value.

According to one or more embodiments of this aspect, the determining of the CQI value based at least in part on the received power offset value includes: adjusting a signal to interference plus noise ratio, SINR, based at least in part on the received power offset value; and determining the CQI value based at least in part on the adjusted SINR. According to one or more embodiments of this aspect, the received rank restriction is higher than a second threshold. According to one or more embodiments of this aspect, the second threshold is selected such that the CQI value is not in a saturated region. According to one or more embodiments of this aspect, the received rank restriction is lower than a third threshold. According to one or more embodiments of this aspect, the third threshold is selected such that the CQI value is not in a saturated region.

According to another aspect of the disclosure, a network node is provided. The network node includes processing circuitry configured to mitigate channel quality indication, CQI, saturation in a channel state information, CSI, report received from a wireless device, WD, at least in part by: at least one of transmitting, to the WD, a channel state information reference signal, CSI-RS, using wide beamforming weights and transmitting, to the WD, configuration information comprising at least one of: a power offset value, a number of CSI reference signal, CSI-RS, ports, and a rank restriction; receiving the CSI report including a CQI value from the WD; and processing the received CQI report based at least in part on at least one of the wide beamforming weights and the transmitted configuration information.

According to one or more embodiments of this aspect, the wide beamforming weights are configured for mapping the number of CSI-RS ports of the configuration information to physical antennas of the network node. According to one or more embodiments of this aspect, the number of CSI-RS ports is less than a first threshold. According to one or more embodiments of this aspect, the first threshold is selected such that the CQI value is not in a saturated region.

According to one or more embodiments of this aspect, the power offset value indicates to the WD to determine the CQI value based at least in part on the received power offset value such that the CQI value is not in a saturated region.

According to one or more embodiments of this aspect, the transmitted rank restriction is higher than a second threshold. According to one or more embodiments of this aspect, the second threshold is selected such that the CQI value is not in a saturated region. According to one or more embodiments of this aspect, the transmitted rank restriction is lower than a third threshold. According to one or more embodiments of this aspect, the third threshold is selected such that the CQI value is not in a saturated region.

According to another aspect of the disclosure, a method implemented in a wireless device, WD, to mitigate channel quality indication, CQI, saturation in a channel state information, CSI, report to a network node is provided. Configuration information comprising any one or more of: a power offset value, a number of channel state information reference signal, CSI-RS, ports, and a rank restriction is received. The CSI report is generated where the CSI report comprising a CQI value based at least in part on the received configuration information. Transmission of the CSI report is optionally caused.

According to one or more embodiments of this aspect, the number of CSI-RS ports is less than a first threshold. According to one or more embodiments of this aspect, the first threshold is selected such that the CQI value is not in a saturated region. According to one or more embodiments of this aspect, the CQI value is determined based at least in part on the received power offset value. According to one or more embodiments of this aspect, the determining of the CQI value based at least in part on the received power offset value includes: adjusting a signal to interference plus noise ratio, SINR, based at least in part on the received power offset value, and determining the CQI value based at least in part on the adjusted SINR.

According to one or more embodiments of this aspect, the received rank restriction is higher than a second threshold. According to one or more embodiments of this aspect, the second threshold is selected such that the CQI value is not in a saturated region. According to one or more embodiments of this aspect, the received rank restriction is lower than a third threshold. According to one or more embodiments of this aspect, the third threshold is selected such that the CQI value is not in a saturated region.

According to another aspect of the disclosure, a method implemented in a network node to mitigate channel quality indication, CQI, saturation in a channel state information, CSI, report received from a wireless device, WD, is provided. At least one of the channel state information reference signal, CSI-RS, using wide beamforming weights and transmitting, to the WD, configuration information comprising any one or more of: a power offset value; a number of channel state information reference signal, CSI-RS, ports; and a rank restriction, is transmitted to the WD. The CSI report including a CQI value from the WD is received. The received CQI value is processed based at least in part on at least one of the wide beamforming weights and the transmitted configuration information.

According to one or more embodiments of this aspect, the wide beamforming weights for mapping the number of CSI-RS ports of the received configuration information to physical antennas of the network node is configured. According to one or more embodiments of this aspect, the transmitted number of CSI-RS ports is less than a first threshold. According to one or more embodiments of this aspect, the first threshold is selected such that the CQI value is not in a saturated region. According to one or more embodiments of this aspect, the power offset value indicates the WD to determine the CQI value based at least in part on the received power offset value such that the CQI value is not in a saturated region.

According to one or more embodiments of this aspect, the transmitted rank restriction is higher than a second threshold. According to one or more embodiments of this aspect, the second threshold is selected such that the CQI value is not in a saturated region. According to one or more embodiments of this aspect, the transmitted rank restriction is lower than a third threshold. According to one or more embodiments of this aspect, the third threshold is selected such that the CQI value is not in a saturated region.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

DETAILED DESCRIPTION

Figure 1:
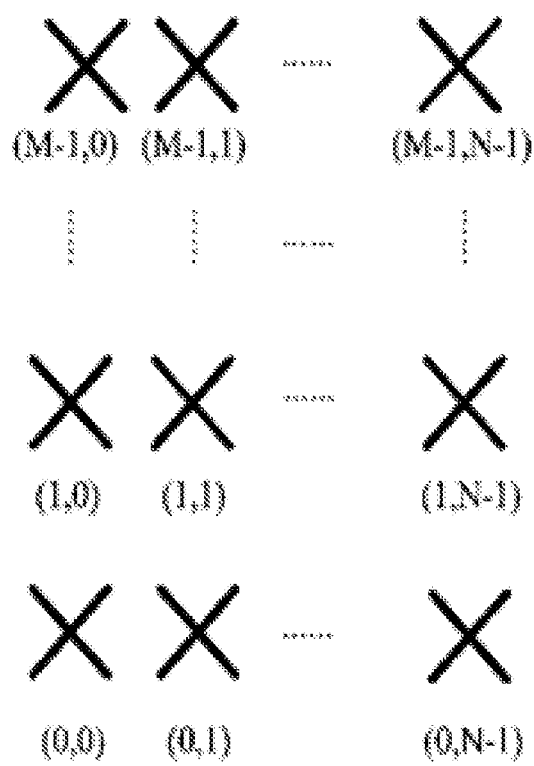
FIG. 1 is a diagram of a two-dimensional antenna element array.
Figure 2:
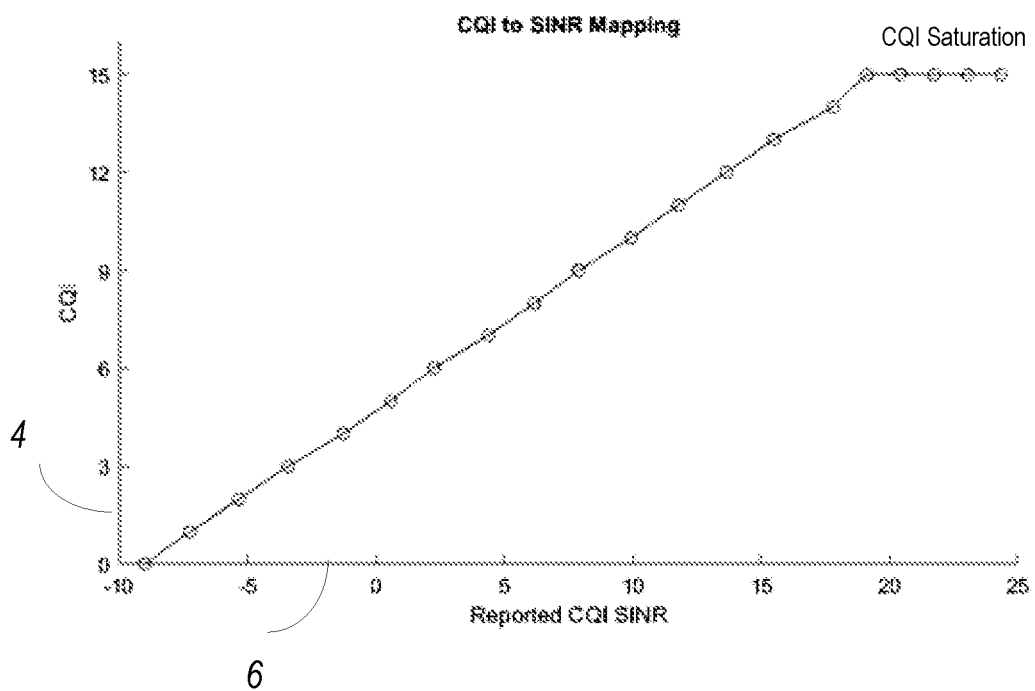
FIG. 2 is a graph of CQI saturation.
Figure 3:
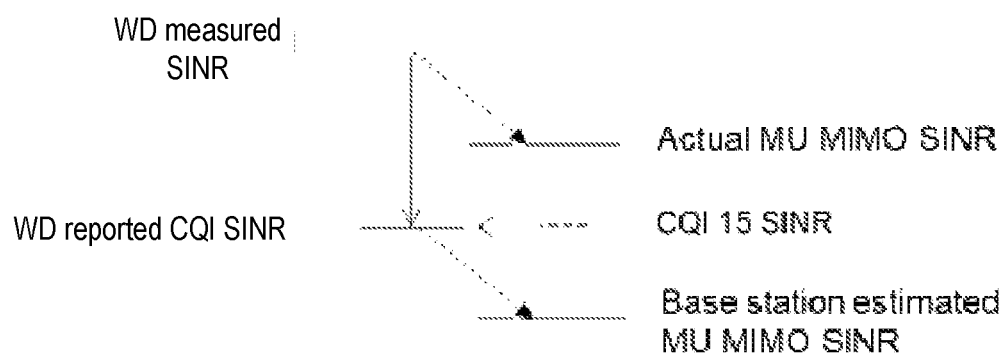
FIG. 3 is an illustration of the conservative SINR estimation caused by CQI saturation.

Before describing in detail exemplary embodiments, it is noted that the embodiments reside primarily in combinations of apparatus components and processing steps related to mitigating CQI saturation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for the mitigation of CQI saturation by increasing the CQI SINR linear range and mitigating the SINR saturation issue that may be encountered in downlink massive MU-MIMO systems. Accordingly, accuracy of the CSI estimation on the network node may be improved with respect to estimates based on a saturated CQI, which may improve massive MU-MIMO performance in 4G LTE and 5G NR systems.

Figure 4:
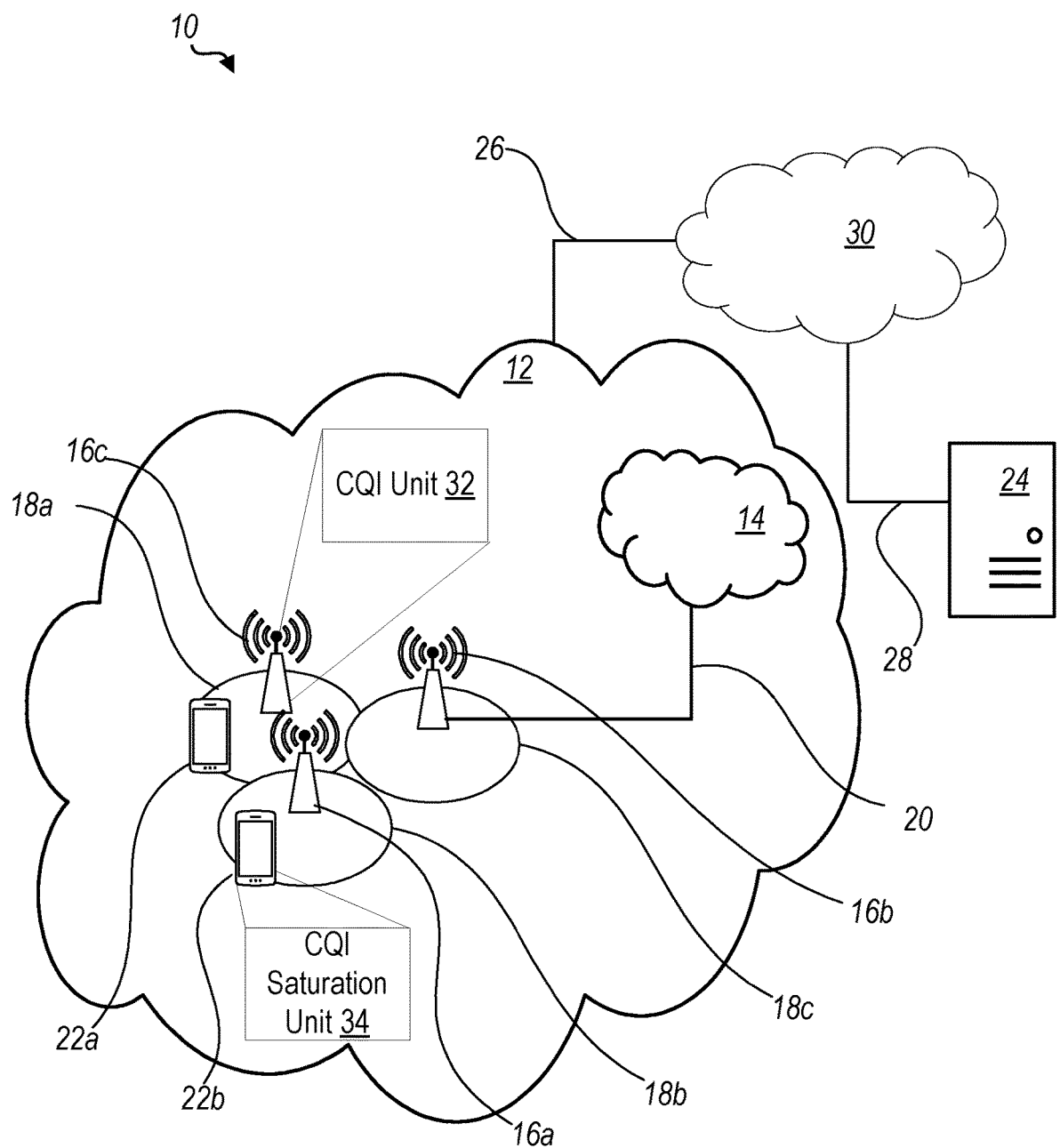
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a CQI unit 32 which is configured to mitigate CQI saturation as described herein. A wireless device 22 is configured to include a CQI saturation unit 34 which is configured to mitigate CQI saturation as described herein. In various embodiments, the WD 22 receives configuration information (e.g. any one or more of: power offset, number of CSI-RS ports, rank restriction) from the network node 16 and then generates the CSI report which includes the CQI based on that information. The network node may also transmit the CSI-RS using wide beamforming weights. The CQI generated by WD 22 results from receiving the transmitted CSI-RS and applying the configuration information. Upon receipt of the CSI report, the network node 16 processes the received CQI using and/or based at least in part on the previously sent configuration information and/or beamforming weights, to derive an adjusted or corrected CQI that more accurately reflects the actual channel conditions than a saturated CQI.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a control unit 54 configured to enable the service provider to monitor and control the network node 16 and or the WD 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include CQI unit 32 configured to mitigate saturation of a CQI index, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CQI saturation unit 34 configured to mitigate CQI saturation, as described herein.

Figure 5:
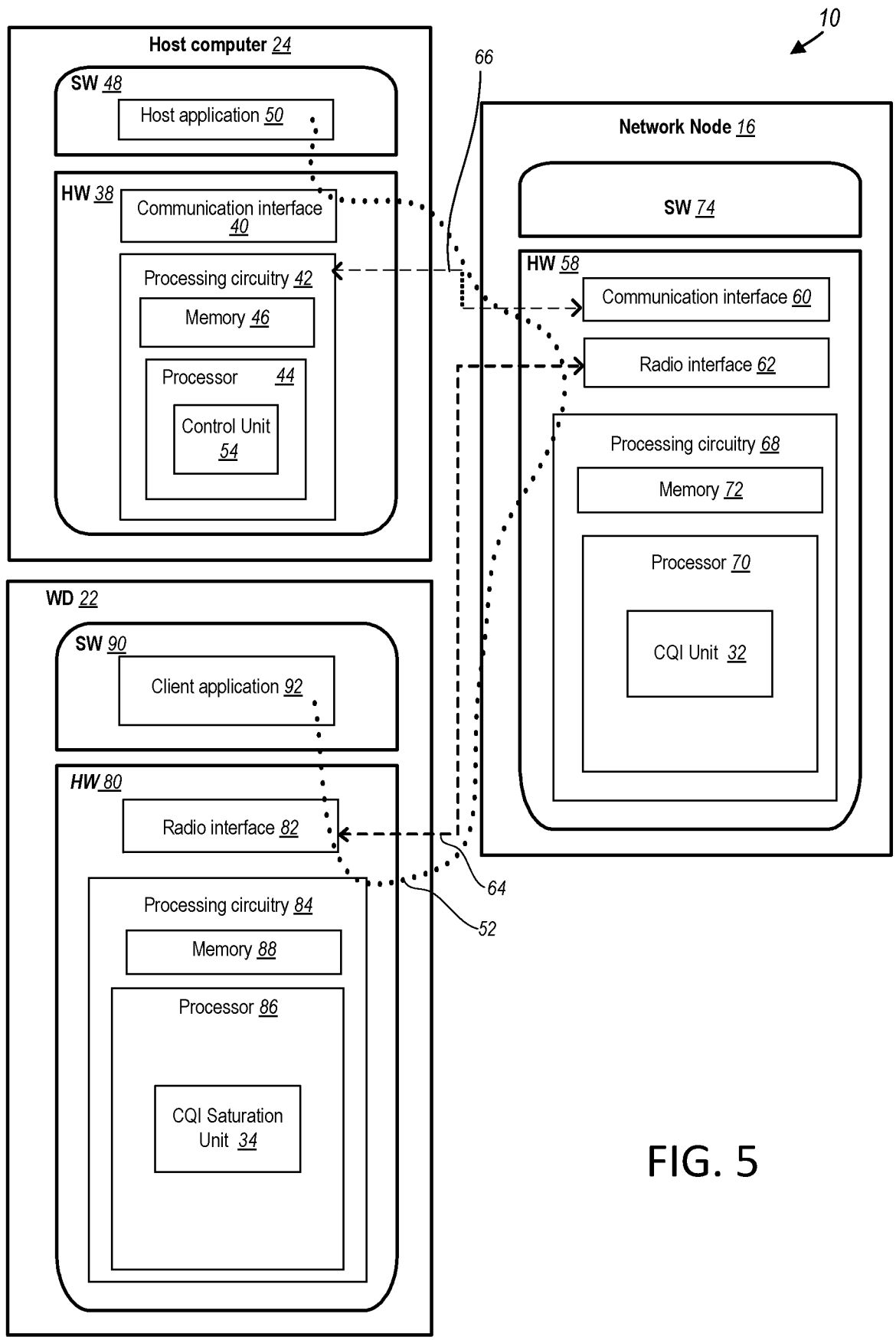
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as CQI unit 32, and CQI saturation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
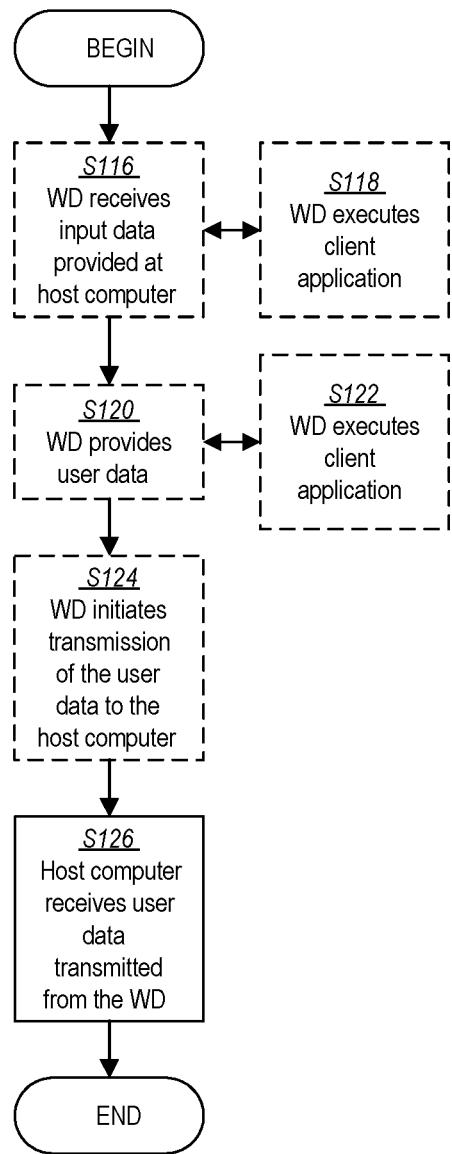
FIG. 8 is a flowchart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
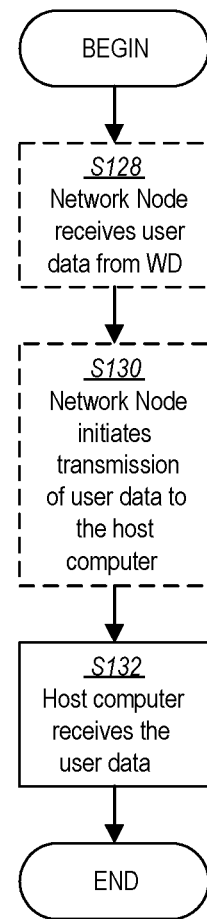
FIG. 9 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
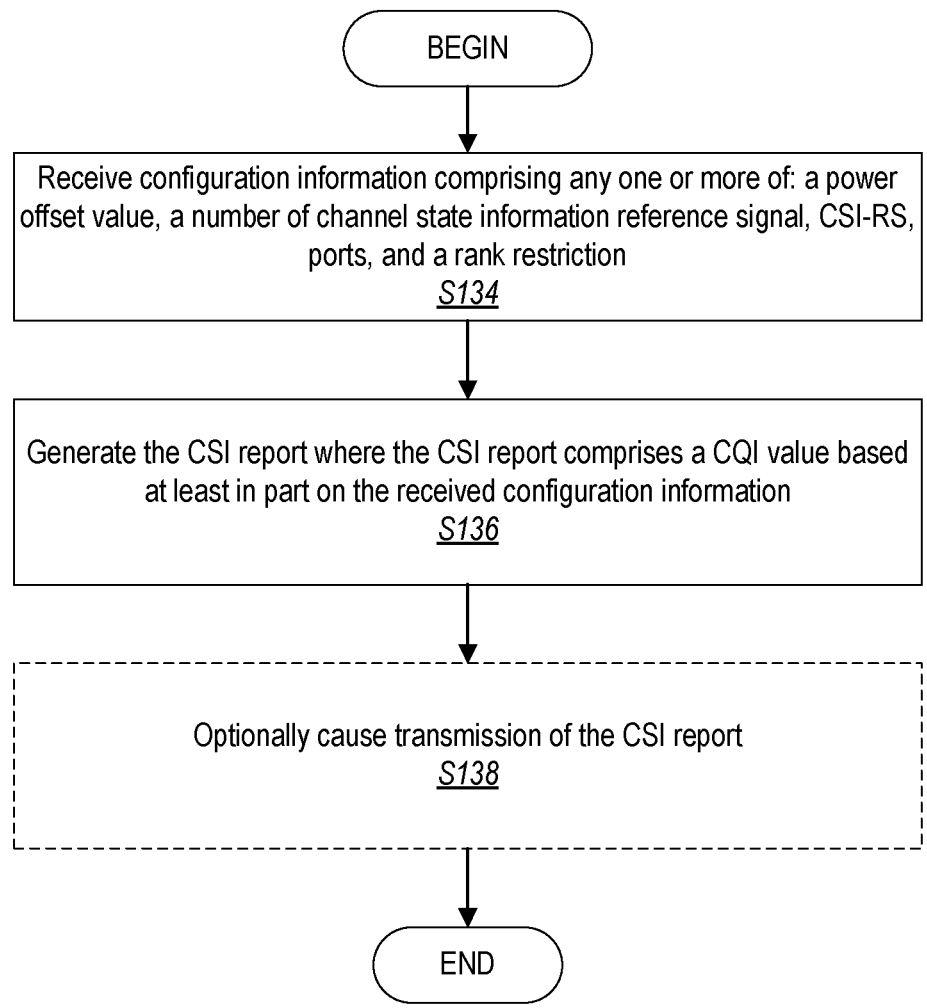
FIG. 10 is a flowchart of an exemplary process in a WD for mitigating CQI saturation according to some embodiments of the present disclosure.

FIG. 10 is a flowchart of an exemplary process in a WD 22 for mitigating CQI saturation according to some embodiments of the present disclosure. One or more Blocks and/or functions performed by WD 22 may be performed by one or more elements of WD 22 such as by CQI saturation unit 34 in processing circuitry 84, processor 86, radio interface 82, etc. In one or more embodiments, WD 22 such as via one or more of processing circuitry 84, processor 86 and radio interface 82 is configured to receive (Block S134) configuration information comprising any one or more of: a power offset value, a number of channel state information reference signal, CSI-RS, ports, and a rank restriction. In one or more embodiments, WD 22 such as via one or more of processing circuitry 84, processor 86 and radio interface 82 is configured to generate (Block S136) the CSI report where the CSI report comprising a CQI value based at least in part on the received configuration information. In one or more embodiments, the CSI report may include one or more of CQI, RI, PMI and CRI values. In one or more embodiments, WD 22 such as via one or more of processing circuitry 84, processor 86 and radio interface 82 is configured to optionally cause (Block S138) transmission of the CSI report.

In one or more embodiments, the number of CSI-RS ports in the configuration information received by WD 22, such as via one or more of processing circuitry 84, processor 86 and radio interface 82, is less than a first threshold. In one or more embodiments, the first threshold is selected such that the CQI value is not in a saturated region. In one or more embodiments, WD 22, such as via one or more of processing circuitry 84, processor 86 and radio interface 82, is further configured to determine the CQI value based at least in part on the received power offset value.

In one or more embodiments, the determining of the CQI value based at least in part on the power offset value includes adjusting a signal to interference plus noise ratio, SINR, based at least in part on the received power offset value, and determining the CQI value based at least in part on the adjusted SINR. In one or more embodiments, the received rank restriction is higher than a second threshold. In one or more embodiments, the second threshold is selected such that the CQI value is not in a saturated region. In one or more embodiments, the received rank restriction is lower than a third threshold. In one or more embodiments, the third threshold is selected such that the CQI value is not in a saturated region.

Figure 11:
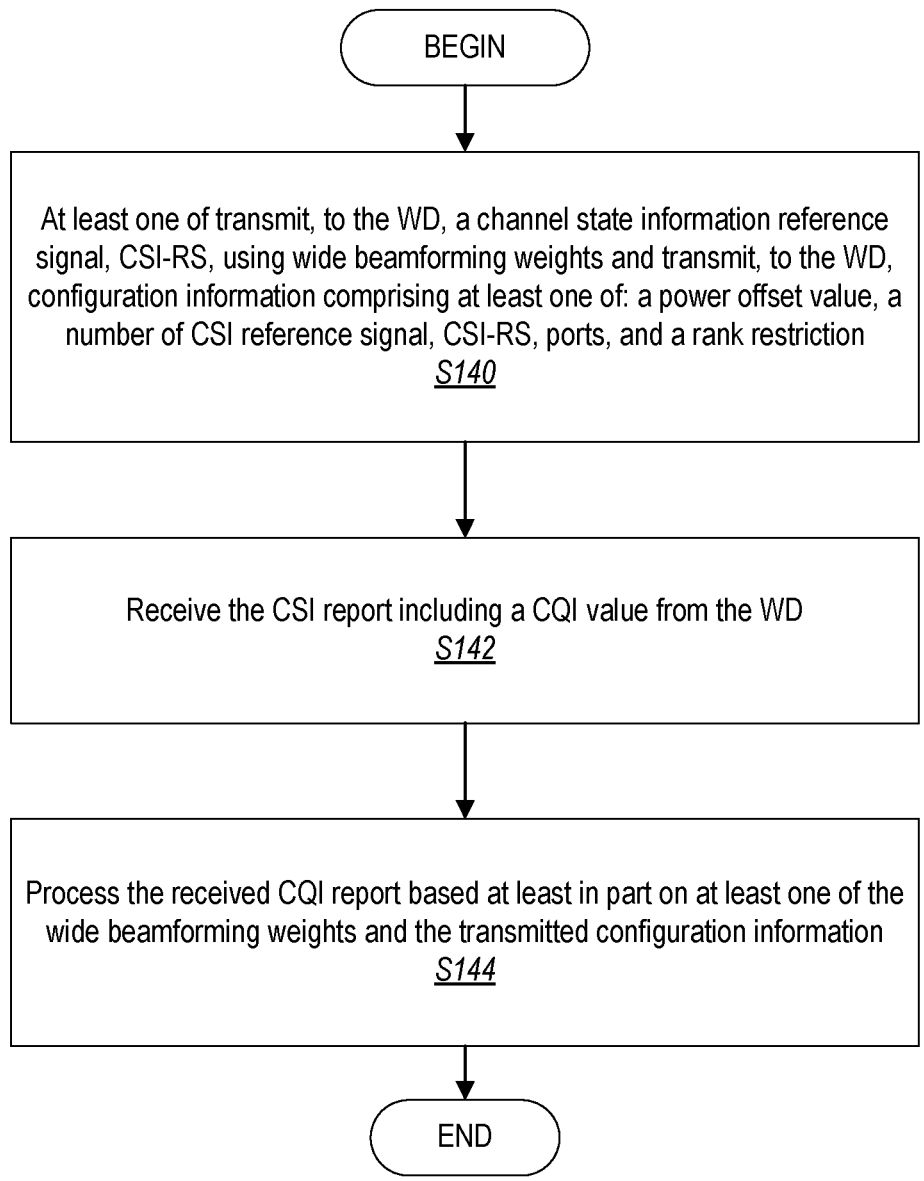
FIG. 11 is a flowchart of an exemplary process in a network node for mitigating CQI saturation according to some embodiments of the present disclosure.

FIG. 11 is a flowchart of an exemplary process in a network node 16 for mitigating CQI saturation according to another embodiment of the present disclosure. One or more Blocks and/or functions performed by network node 16 may be performed by one or more elements of network node 16 such as by CQI unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to at least one of transmit (Block S140), to the WD 22, the channel state information reference signal, CSI-RS, using wide beamforming weights and transmit, to the WD 22, configuration information comprising any one or more of: a power offset value; a number of channel state information reference signal, CSI-RS, ports; and a rank restriction.

In one or more embodiments, network node 16 such as via one or more of processing circuitry 68, processor 70, radio interface 62 and communication interface 60 is configured to receive (Block S142) the CSI report including a CQI value from the WD 22. In one or more embodiments, network node 16 such as via one or more of processing circuitry 68, processor 70, radio interface 62 and communication interface 60 is configured to process (Block S144) the received CQI report based at least in part on at least one of the wide beamforming weights and the transmitted configuration information. In one or more embodiments, the received CQI report is processed based at least in part on the wide beamforming weights and the transmitted configuration information where the CSI report includes one or more of CQI, RI, PMI and CRI values.

In one or more embodiments, network node 16 such as via one or more of processing circuitry 68, processor 70, radio interface 62 and communication interface 60 is configured to configure the wide beamforming weights for mapping the number of CSI-RS ports of the received configuration information to physical antennas of the network node 16. In one or more embodiments, network node 16 such as via one or more of processing circuitry 68, processor 70, radio interface 62 and communication interface 60 configures the number of CSI-RS ports to be less than a first threshold. In one or more embodiments, network node 16 such as via one or more of processing circuitry 68, processor 70, radio interface 62 and communication interface 60 is configured to select the first threshold such that the CQI value is not in a saturated region.

In one or more embodiments, the power offset value indicates to the WD 22 to determine the CQI value based at least in part on the received power offset value such that the CQI value is not in a saturated region. In one or more embodiments, the transmitted rank restriction is higher than a second threshold. In one or more embodiments, the second threshold is selected such as via one or more of processing circuitry 68, processor 70, etc. such that the CQI value is not in a saturated region. In one or more embodiments, the transmitted rank restriction is lower than a third threshold. In one or more embodiments, the third threshold is selected such a via one or more of processing circuitry 68, processor 70, CQI unit 32, etc. such that the CQI value is not in a saturation region.

Having described the general process flow of arrangements of the disclosure and having provided examples of hardware and software arrangements for implementing the processes and functions of the disclosure, the sections below provide details and examples of arrangements for mitigating the CQI saturation in a CSI report.

One or more embodiments provide for increasing the CQI range such as a linear range using multiple CSI reports with different power offsets whereby the different power offsets indicate a CQI adjustment. CSI report generation at the WD 22, such as via one or more of processing circuitry 84, CQI saturation unit 34, etc. may be based on the measurement of a non-zero power (NZP) CSI-RS resource. When a WD 22 derives CSI feedback, a power control offset, which is the assumed ratio of the physical downlink shared channel (PDSCH) energy per resource element (EPRE) to the NZP CSI-RS EPRE and takes values in the range of [−8, 15], can be configured. When a positive power control offset value is configured, the SINR values represented by CQI indexes may be shifted by the offset amount/value, i.e.

$$CQI\_SINR\_Reported = CQI\_SINR\_Measured + powerControlOffset$$

The measured CQI SINR can be recovered on the network node 16 by $$CQI\_SINR\_Measured = CQI\_SINR\_Reported - powerControlOffset$$

Figure 12:
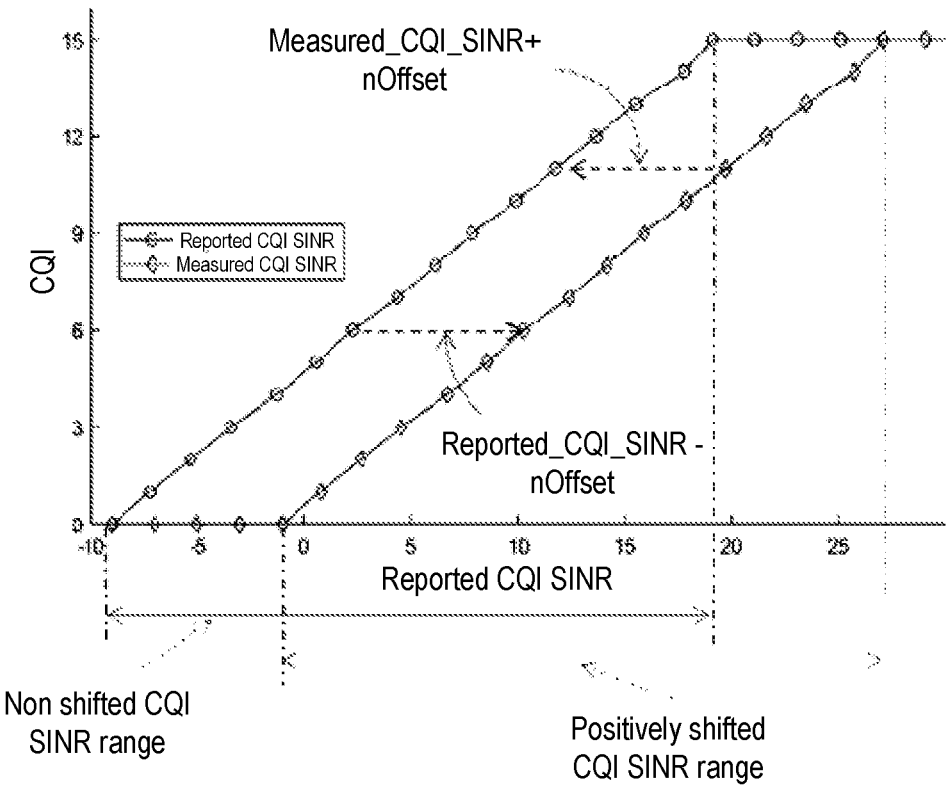
FIG. 12 is an illustration of a positively shifted CQI SINR range according to some embodiments of the present disclosure.

When a negative power control offset value (nOffset), e.g., −8 dB, is configured, the measured CQI SINR received at the network node 16 such as via one or more of radio interface 62, processing circuitry 68, CQI unit 32, etc., the received CQI value may be processed by the network node 16 based on the transmitted configuration information such that the received CQI may be shifted toward a higher SINR by an absolute value of nOffset. This is illustrated in FIG. 12 wherein the measured CQI SINR is shifted by nOffset to produce the reported CQI SINR. This shifting provides an additional linear range at higher SINR values such as to help avoid CQI saturation for a range equal to nOffset.

Figure 13:
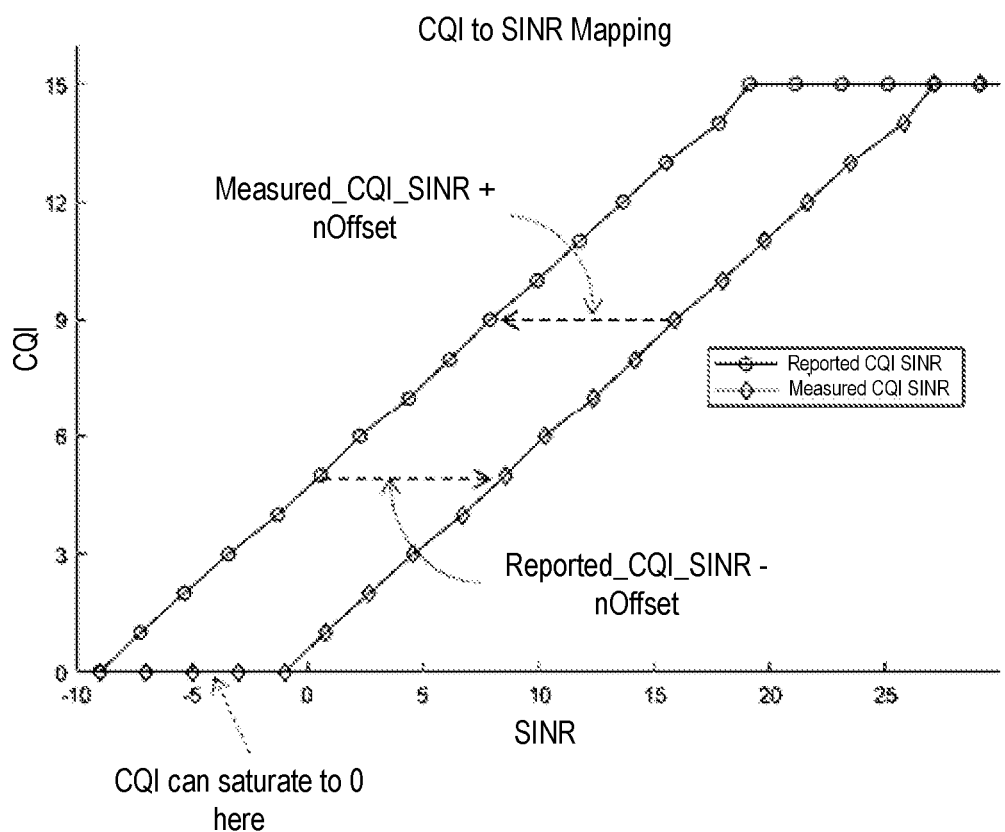
FIG. 13 is an illustration of a CQI to SINR mapping according to some embodiments of the present disclosure.

However, since the measured CQI SINR range is shifted to the right, as shown in the example of FIG. 12, there is a possibility that the CQI saturates to CQI 0 at a low SINR as shown in FIG. 13. Also, when WD 22 such as via one or more of processing circuitry 84, CQI saturation unit 34, etc. generates a CSI report with a positively shifted CQI SINR, the RI estimate tends to be lower than actual optimal channel rank. As a WD 22 in the network can be paired with other WDs 22 in some Transmission Time Intervals (TTI) for MU-MIMO transmissions, and in other TTIs not be paired with any WDs 22 and undertake SU-MIMO transmission, CQI saturation at low SINR range and lower RI estimation may negatively impact SU-MIMO performance. Therefore, in one or more embodiments, two CSI reports may be configured to each WD 22, one without a power shift that is used for SU-MIMO transmission, another one with a negative power control offset that is used for MU-MIMO transmission. Network node 16 may then process the received CQI value based on the transmitted configuration information to derive the SINR.

Figure 14:
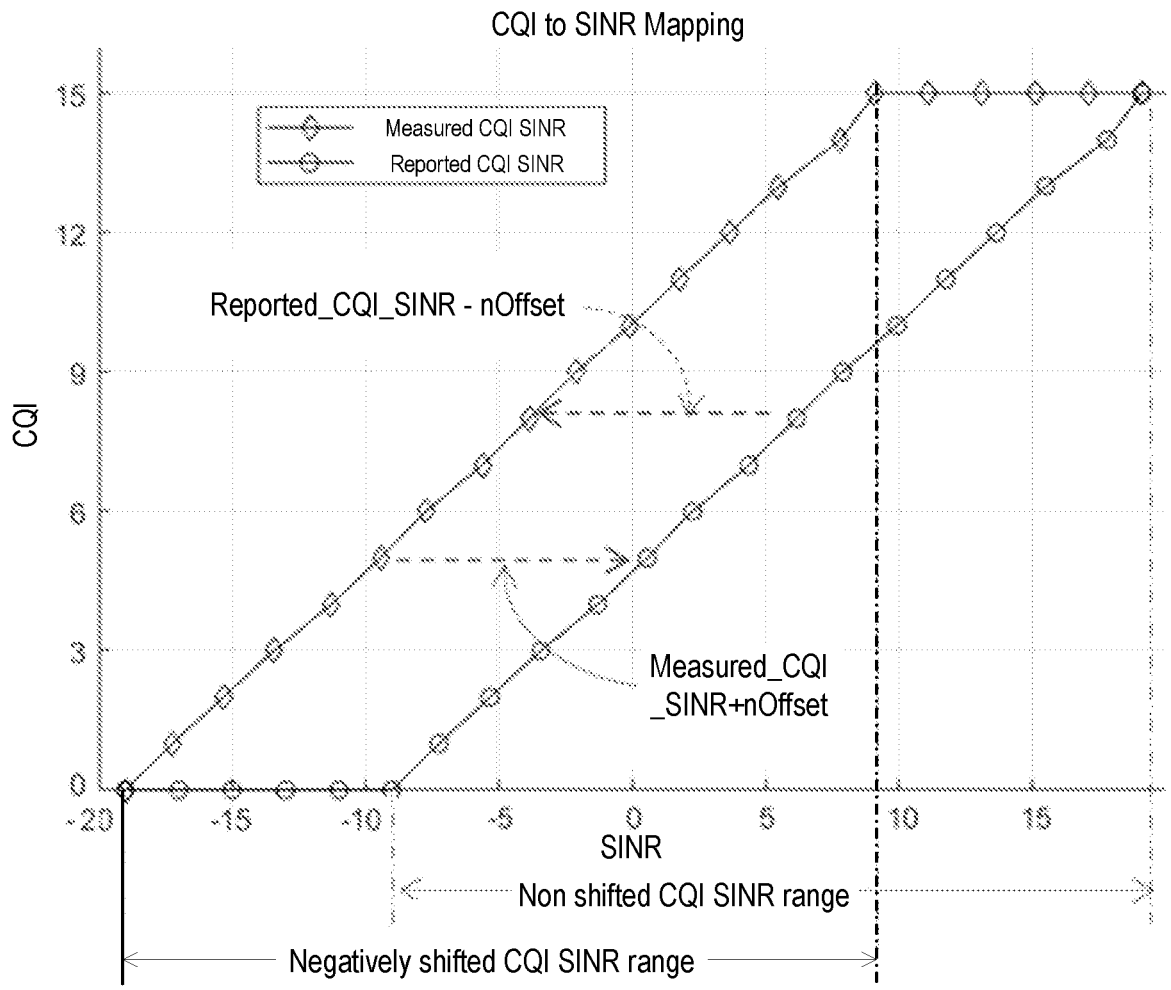
FIG. 14 is an illustration of a negatively shifted CQI SINR range according to some embodiments of the present disclosure.

Furthermore, in some embodiments, the CQI linear range may need to be extended at a lower SINR. For example, when the cell coverage is increased due to the high beamforming gain provided by massive MIMO systems. In that case, a positive power control offset (pOffset) value can be configured to a third CSI report. The measured CQI SINR received on network node 16 may then be processed by the network node 16 based on the configuration information and shifted toward the lower SINR end as illustrated in FIG. 14.

Embodiments also provide for increasing the CQI range (e.g., linear range) by using a small number of CSI-RS ports for CSI reporting and/or using wide beamformed weights for CSI reporting, thereby, for example, reducing the beamforming gain. These embodiments relating to a reduced number of CSI-RS ports and wide beamformed weights may be used separate from or combined with one or more other embodiments described herein.

For example, the smallest power control offset value specified by wireless communication protocols such as 3GPP based protocols may be −8 dB. In massive MIMO systems which provide high beamforming gain, sometimes the 8 dB extension of linear SINR range at high SINR values is not enough to avoid CQI saturation at CQI 15. In this case, another process can be applied to the positively shifted CSI report described herein. This process includes the network node 16 configuring a small number of CSI-RS ports to the CSI report and/or using wide beamforming weights to map the CSI-RS ports to the physical antennas of the network node 16. Network node 16 then transmits the CSI-RS using the wide beamforming weights that map the number of CSI-RS ports to the physical antennas of network node 16. WD 22 may then detect the received signal, and use it to calculate the CQI. Network node 16 can then take the reduced number of CSI-RS ports and wide beamforming weights into account when processing the received CQI to determine the SINR.

The CQI generation is based on the RI and PMI discussed herein. For a given rank, reported PMI represents a codebook-based precoder, selected in a codebook, for the number of CSI-RS ports configured for the CSI report. The PMI codebook specified in wireless communication standards such as 3GPP is based on a set of pre-defined precoding matrices. The precoding matrix, denoted as W, can be described as a two-stage precoding structure as follows:

$$W = W_1 W_2.$$

The first stage of the precoding structure, i.e., $W_1$ may be described as a codebook, and consists essentially a group of two dimensional (2D) grid-of-beams (GoB), which may be characterized as $$W_1 = \begin{bmatrix} w_h \otimes w_v & 0 \\ 0 & w_h \otimes w_v \end{bmatrix},$$

where $w_h$ and $w_v$ are precoding vectors selected from over-sampled discrete Fourier Transforms (DFT) for horizontal direction and vertical direction, respectively, and may be expressed by $$w_v = \frac{1}{\sqrt{M}} \left[ 1, e^{\frac{j2\pi v}{MO_1}}, \ldots, e^{\frac{j2\pi mv}{MO_1}}, \ldots, e^{\frac{j2\pi(M-1)v}{MO_1}} \right]^T,$$

$$w_h = \frac{1}{\sqrt{N}} \left[ 1, e^{\frac{j2\pi h}{NO_2}}, \ldots, e^{\frac{j2\pi nv}{NO_2}}, \ldots, e^{\frac{j2\pi(N-1)h}{NO_2}} \right]^T,$$

where $O_1$ and $O_2$ are the over-sampling rate in the vertical and horizontal directions, respectively.

The second stage of the precoding matrix, i.e. $W_2$, is used for beam selection within the group of 2D GoB as well as the associated co-phasing between two polarizations.

Figure 15:
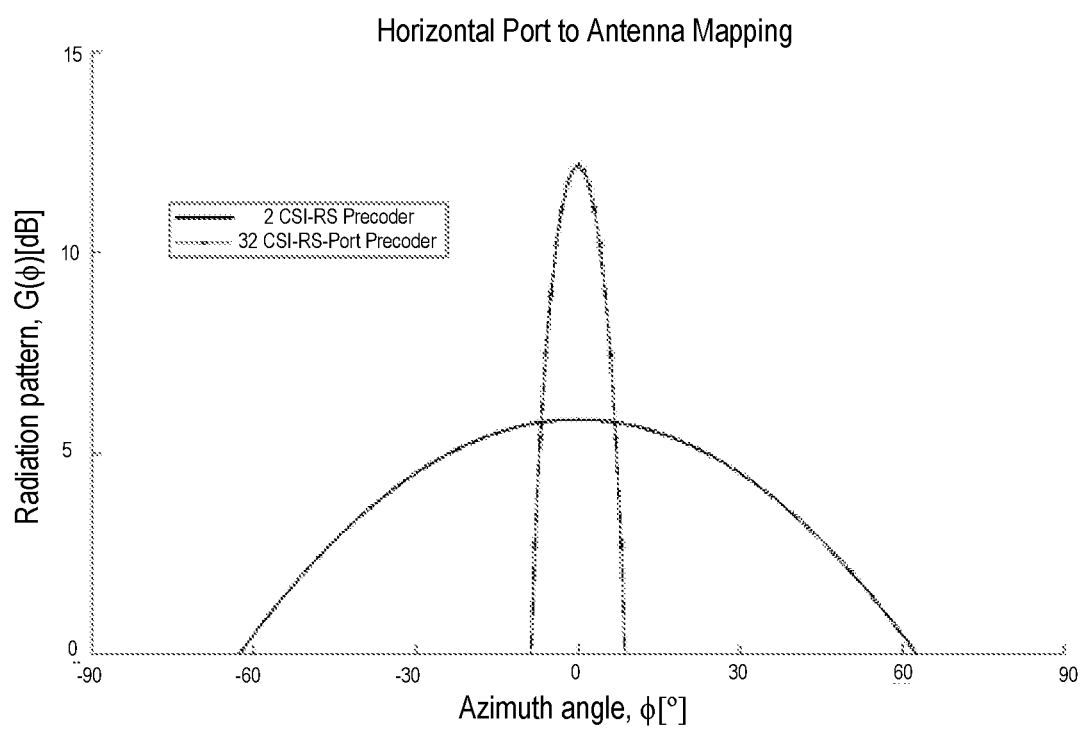
FIG. 15 is an illustration of horizontal port to antenna mapping according to some embodiments of the present disclosure.

Let $N_{CSI-RS}$ be the number of CSI-RS ports configured for CSI report. A precoder in PMI codebook may corresponds to an over sampled $N_{CSI-RS}/2$ point DFT beam. A higher point DFT beam may have a narrower beam form and hence higher beamforming gain than a lower point DFT beam as shown in FIG. 15. Therefore, configuring a small number of CSI-RS ports for the CSI report used for MU-MIMO transmission purposes may help to avoid CQI saturation at high SINR values.

Furthermore, in a case where the number of physical antennas is bigger than $N_{CSI-RS}$, the CSI-RS antenna ports can be mapped to physical antennas of network node 16 using wide beamforming weights instead of narrow beamforming weights. This lowers the gain of the antennas and may mitigate CQI saturation.

Embodiments also provide for increasing the CQI linear range using a rank restriction which may limit the rank(s) the wireless device 22 is allowed to select and/or report via the rank indication. As described herein, CQI generation by WD 22 may be conditioned on the RI. For the same channel conditions, when RI selected by the WD 22 is higher, CQI may be lower/lowered. In other words, the RI may be selected to be higher than a threshold (i.e., second threshold) to mitigate CQI saturation at high SINR. The threshold (i.e., second threshold), in this case, may be a lower bound, thereby restricting lower ranks from being selected by the WD 22 such as via one or more of processing circuitry 84, processor 86, CQI saturation unit 34, etc. Hence, to avoid CQI saturation at high SINR, a RI-Restriction (also referred to as a rank restriction or RI rank restriction) can be configured to the CSI report used for a MU-MIMO case to restrict the rank to higher allowed ranks (or to ranks greater than the second threshold), thereby helping further mitigate CQI saturation issue in massive MU-MIMO systems.

Also, for the same channel conditions, when RI selected by the WD 22 is lower, CQI may be higher or made higher. In other words, the RI may be selected to be lower than a threshold (i.e., third threshold) to mitigate CQI saturation at low SINR. The threshold (i.e., third threshold), in this case, may be a higher bound, thereby restriction higher ranks (or ranks higher than the third threshold) from being selected by the WD 22 such as via one or more of processing circuitry 84, processor 86, CQI saturation unit 34, etc. Hence, to avoid CQI saturation at low SINR, a rank restriction (also referred to as RI restriction or RI rank restriction) can be configured to the CSI report used for a MU-MIMO case to restrict the rank to lower allowed ranks, thereby helping further mitigate CQI saturation issue in massive MU-MIMO systems.

Further, applying the rank restriction upper bound and lower bound to the same WD 22 may be performed through two different CSI reports where each of the reports is configured with a separate CSI-RS resource.

Network node 16 may then process the received CQI value based on the transmitted configuration information to derive the SINR such as by considering the restricted RI, for example. In one or more embodiments, the RI rank restriction may be defined by one or more wireless communication standards such as 3GPP based wireless communication standards.

Figure 16:
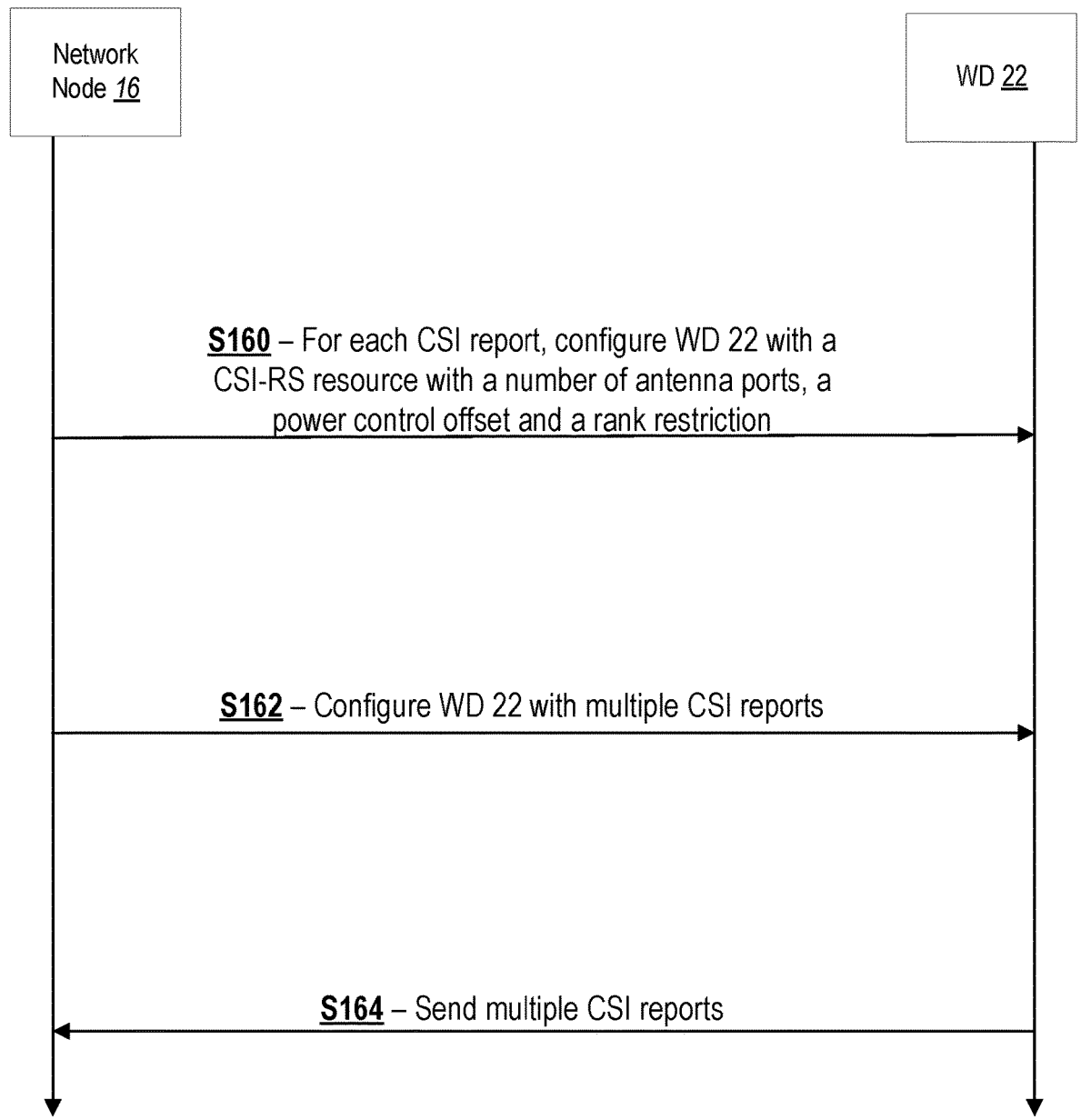
FIG. 16 is an illustration of an exemplary signaling flow according to some embodiments of the present disclosure.

FIG. 16 is an illustration of an exemplary signaling flow according to some embodiments of the present disclosure. According to the signaling flow shown in FIG. 16, network node 16, such as via one or more of radio interface 62, processing circuitry 68, CQI unit 32, etc., configures (Block S160), for each CSI report, WD 22 with a CSI-RS resource with a number of antenna ports, a power control offset and a rank restriction. For example, in one or more embodiments, the network node 16 such as via one or more of radio interface 62, processing circuitry 68, CQI unit 32, etc., configures one or more WDs 22, such as via one or more of processing circuitry 84, CQI saturation unit 34, etc. with one or multiple CSI-RS resources with a power control offset and a number of antenna ports that can be used to mitigate CQI saturation. For example, on network node 16, different beamforming weights can be applied to aforementioned CSI-RS resources to achieve different half power beam widths (HPBW). For example, in one or more embodiments, network node 16, such as via one or more of radio interface 62, processing circuitry 68, CQI unit 32, etc., configures each WD 22, such as via one or more of processing circuitry 84, CQI saturation unit 34, etc., with one or multiple CSI-RS resources where each CSI-RS resource is configured with a CQI powerControlOffset and a number of antenna ports, and the network node 16 can apply different beamforming weights to the CSI-RS resources to achieve different HPBW.

Network node 16, such as via one or more of radio interface 62, processing circuitry 68, CQI unit 32, etc., then configures (Block S162) multiple CSI reports. Each CSI report may be associated with one or more CSI-resources and configured with a rank restriction. WD 22, such as via one or more of processing circuitry 84, CQI saturation unit 34, etc., sends (Block S164) multiple CSI reports based on the configuration(s). In additional embodiments, different reports may have different report periodicity or different report types as well.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device (WD) comprising processing circuitry configured to mitigate channel quality indication (CQI) saturation in a channel state information (CSI) report to a network node by at least in part:
   receiving configuration information comprising any one or more of: a power offset value, a number of channel state information reference signal (CSI-RS) ports, and a rank restriction;
   generating the CSI report, the CSI report comprising a CQI value with mitigated CQI saturation, the CQI value being based at least in part on the received configuration information; and
   causing transmission of the CSI report.

2. The WD of claim 1, wherein the number of CSI-RS ports is less than a first threshold.

3. The WD of claim 2, wherein the first threshold is selected such that the CQI value is not in a saturated region.

4. The WD of claim 1, wherein the processing circuitry is further configured to determine the CQI value based at least in part on the received power offset value.

5. The WD of claim 4, wherein the determining of the CQI value based at least in part on the received power offset value includes:
   adjusting a signal to interference plus noise ratio (SINR) based at least in part on the received power offset value; and
   determining the CQI value based at least in part on the adjusted SINR.

6. The WD of claim 1, wherein the received rank restriction is higher than a second threshold.

7. The WD of claim 6, wherein the second threshold is selected such that the CQI value is not in a saturated region.

8. The WD of claim 1, wherein the received rank restriction is lower than a third threshold.

9. The WD of claim 8, wherein the third threshold is selected such that the CQI value is not in a saturated region.

10. A network node, comprising processing circuitry configured to mitigate channel quality indication (CQI) saturation in a channel state information (CSI) report received from a wireless device (WD) at least in part by:
    at least one of transmitting, to the WD, a channel state information reference signal (CSI-RS) using wide beamforming weights and transmitting, to the WD, configuration information comprising at least one of: a power offset value, a number of CSI-RS ports, and a rank restriction;
    receiving, from the WD, the CSI report including a CQI value with mitigated CQI saturation, the CQI value being based at least in part on the configuration information; and
    processing the received CQI report based at least in part on at least one of the wide beamforming weights and the transmitted configuration information.

11. The network node of claim 10, wherein the wide beamforming weights are configured for mapping the number of CSI-RS ports of the configuration information to physical antennas of the network node.

12. The network node of claim 10, wherein the number of CSI-RS ports is less than a first threshold.

13. The network node of claim 12, wherein the first threshold is selected such that the CQI value is not in a saturated region.

14. The network node of claim 10, wherein the power offset value indicates to the WD to determine the CQI value based at least in part on the received power offset value such that the CQI value is not in a saturated region.

15. The network node of claim 10, wherein the transmitted rank restriction is higher than a second threshold.

16. The network node of claim 15, wherein the second threshold is selected such that the CQI value is not in a saturated region.

17. The network node of claim 10, wherein the transmitted rank restriction is lower than a third threshold.

18. The network node of claim 17, wherein the third threshold is selected such that the CQI value is not in a saturated region.

19. A method implemented in a wireless device, WD, to mitigate channel quality indication (CQI) saturation in a channel state information (CSI) report to a network node, the method at least in part comprising:
    receiving configuration information comprising any one or more of: a power offset value; a number of channel state information reference signal (CSI-RS) ports; and a rank restriction;
    generating the CSI report, the CSI report comprising a CQI value with mitigated CQI saturation, the CQI value being based at least in part on the received configuration information; and
    causing transmission of the CSI report.

20. The method of claim 19, wherein the number of CSI-RS ports is less than a first threshold.

21. The method of claim 20, wherein the first threshold is selected such that the CQI value is not in a saturated region.

22. The method of claim 19, further comprising determining the CQI value based at least in part on the received power offset value.

23. The method of claim 22, wherein the determining of the CQI value based at least in part on the received power offset value includes:
adjusting a signal to interference plus noise ratio (SINR) based at least in part on the received power offset value; and
determining the CQI value based at least in part on the adjusted SINR.

24. The method of claim 19, wherein the received rank restriction is higher than a second threshold.

25. The method of claim 24, wherein the second threshold is selected such that the CQI value is not in a saturated region.

26. The method of claim 19, wherein the received rank restriction is lower than a third threshold.

27. The method of claim 26, wherein the third threshold is selected such that the CQI value is not in a saturated region.

28. A method implemented in a network node to mitigate channel quality indication (CQI) saturation in a channel state information (CSI) report received from a wireless device (WD), the method at least in part comprising:
at least one of transmitting, to the WD, the channel state information reference signal (CSI-RS) using wide beamforming weights and transmitting, to the WD, configuration information comprising any one or more of: a power offset value; a number of (CSI-RS) ports; and a rank restriction;
receiving, from the WD, the CSI report including a CQI value with mitigated CQI saturation, the CQI value being based at least in part on the configuration information; and
processing the received CSI report based at least in part on at least one of the wide beamforming weights and the transmitted configuration information.

29. The method of claim 28, further comprising configuring the wide beamforming weights for mapping the number of CSI-RS ports of the received configuration information to physical antennas of the network node.

30. The method of claim 28, wherein the transmitted number of CSI-RS ports is less than a first threshold.

31. The method of claim 30, wherein the first threshold is selected such that the CQI value is not in a saturated region.

32. The method of claim 28, wherein the power offset value indicates to the WD to determine the CQI value based at least in part on the received power offset value such that the CQI value is not in a saturated region.

33. The method of claim 28, wherein the transmitted rank restriction is higher than a second threshold.

34. The method of claim 33, wherein the second threshold is selected such that the CQI value is not in a saturated region.

35. The method of claim 28, wherein the transmitted rank restriction is lower than a third threshold.

36. The method of claim 35, wherein the third threshold is selected such that the CQI value is not in a saturated region.

* * * * *